United States Patent
Volpe (12)

(10) Patent No.: US 6,398,012 B1
(45) Date of Patent: Jun. 4, 2002

(54) SUPPORT AND COUPLING ASSEMBLY FOR SCREW CONVEYOR

(76) Inventor: Tom Volpe, 232 South Service Road, Stoney Creek (CA), L8E 2N9

( * ) Notice: Subject to any disclaimer, the term of this patent is extended or adjusted under 35 U.S.C. 154(b) by 0 days.

(21) Appl. No.: 09/629,750

(22) Filed: Jul. 31, 2000

(30) Foreign Application Priority Data

Nov. 2, 1999 (CA) ............................................. 2288325

(51) Int. Cl.⁷ ............................................. B65G 33/32
(52) U.S. Cl. ....................................... 198/672; 198/659
(58) Field of Search ................................ 198/672, 659; 464/74

(56) References Cited

U.S. PATENT DOCUMENTS

| | | | | | |
|---|---|---|---|---|---|
| 3,195,324 A | * | 7/1965 | Sellwood | ......................... | 64/14 |
| 3,427,827 A | * | 2/1969 | Airheart | ......................... | 64/14 |
| 4,220,242 A | * | 9/1980 | Forsberg | ...................... | 198/666 |
| 4,424,046 A | * | 1/1984 | Ziegler | ......................... | 464/74 |
| 4,627,885 A | * | 12/1986 | Arlt | .............................. | 156/160 |
| 4,645,067 A | * | 2/1987 | George | .......................... | 198/666 |
| 5,222,591 A | * | 6/1993 | Bertola et al. | ............... | 198/672 |

* cited by examiner

*Primary Examiner*—Christopher P. Ellis
*Assistant Examiner*—Rashmi Sharma

(57) ABSTRACT

A support and coupling assembly for a screw conveyor which has first and second screw lengths aligned axially along an axial axis is disclosed. The support and coupling assembly couples the first and second screw conveyor lengths and also supports the two conveyor lengths were they are coupled. The assembly accommodates deflection between the first and second screw conveyor lengths by arranging radially-extending blades from respective ones of outer and inner members wherein the blades are spaced alternately with and angularly from respective blades to form angular spaces between blades. A resilient material is placed in the angular spaces between blades. The blades are aligned and configured to assist in easier manufacture of the assembly.

20 Claims, 4 Drawing Sheets

SUPPORT AND COUPLING ASSEMBLY FOR SCREW CONVEYOR

FIELD OF THE INVENTION

This invention relates to a support and coupling assembly in a screw conveyor and particularly a screw conveyor used in the blast cleaning industry. Typically a screw conveyor comprises at least first and second screw conveyor lengths which are aligned axially along an axial axis. There is a need to support the two lengths of screw conveyor and to couple the two lengths together.

BACKGROUND OF THE INVENTION

In the past, there have been different types of devices used to support or couple the lengths of screw conveyor. However, none of those devices seem to have worked satisfactorily, especially when the screw conveyor was used to move blast cleaning shot in the blast cleaning industry.

Typically, lengths of screw conveyor are about 10 to 12 feet in length. The screw conveyor lengths are rotated relatively slowly by a motor. The conveyor lengths have screw flights which rotate as the screw conveyor length rotates and thereby move the material intended to be moved.

It is necessary to support the ends of the lengths of screw conveyor and to transfer the rotation of the first length of screw conveyor into rotation of a second length of screw conveyor. However, over the length of 10 or 12 feet there is some considerable deflection of the ends of the screw conveyors off the axial axis. In some cases, this deflection can be one-half inch to one inch or more.

The past devices used to support and couple screw conveyor lengths were typically rigid and difficult to assemble. Also, these devices were prone to break-down caused to a large degree by the deflection of the ends of the screw conveyor lengths, and it was difficult to replace broken parts. Also, there was a considerable gap or distance between the first screw conveyor length and the second screw conveyor length such that at least some of the material intended to be moved by the screw conveyor would fall or drop onto and into the various components of the prior art devices, thereby leading and contributing to break-down of the prior art devices.

SUMMARY OF THE INVENTION

Accordingly, it is an object of this invention to at least partially overcome the disadvantages of the prior art. Also, it is an object of this invention to provide an improved support and coupling assembly in a screw conveyor, particularly a screw conveyor in the blast cleaning industry.

Accordingly, in one of its aspects, this invention resides in providing a support and coupling assembly in a screw conveyor comprising first and second screw conveyor lengths aligned axially along an axis, the assembly comprising a first deflection-accomodating means for accommodating deflection off the axial axis between the first screw conveyor length and the second screw conveyor length; second deflection-accommodating means for accommodating deflection off the axial axis between the first screw conveyor length and the second screw conveyor length; first connecting means for connecting the first deflection-accommodating means to the first screw conveyor length; second connecting means for connecting the second deflection-accommodating means to the second screw conveyor length; a drive shaft connecting the first deflection-accommodating means to the second deflection-accommodating means; and support means for supporting the drive shaft; wherein the first deflection-accommodating means comprises an outer member aligned axially and concentrically with the first length of screw conveyor along an axial axis, and having an outer diameter substantially the same as the outer diameter of the first screw conveyor; an inner member aligned axially and concentrically within the outer member along the axial axis, and having an outer diameter greater than the outer diameter of the drive shaft; a first plurality of blades wherein each blade extends radially inwardly from the outer member and axially along the outer member; a second plurality of blades wherein each blade extends radially outwardly from the inner member and axially along the inner member; wherein the blades of the first plurality of inwardly-extending blades are spaced alternately with and angularly from the blades of the second plurality of outwardly-extending blades to form angular spaces between blades; and a resilient material in the angular spaces between blades; wherein the second deflection-accommodating means comprises an outer member aligned axially and concentrically with the second length of screw conveyor along the axial axis, and having an outer diameter substantially the same as the outer diameter of the second screw conveyor; an inner member aligned axially and concentrically within the outer member along the axial axis and having an outer diameter greater than the outer diameter of the drive shaft; a first plurality of blades wherein each blade extends radially inwardly from the outer member and axially along the outer member; a second plurality of blades wherein each blade extends radially outwardly from the inner member and axially along the inner member; wherein the blades of the first plurality of inwardly-extending blades are spaced alternately with and angularly from the blades of the second plurality of outwardly-extending blades to form angular spaces between blades; and a resilient material in the angular spaces between blades; wherein a first end of the drive shaft is fixed within the inner member of the first deflection-accommodating means; wherein a second end of the drive shaft is fixed within the inner member of the second deflection-accommodating means; and wherein the support means comprises a support bearing supporting the drive shaft intermediate of the first end and the second end of the drive shaft and a support member supporting the support bearing to a fixed object.

Further aspects of the invention will become apparent upon reading the following detailed description and drawings which illustrate the invention and preferred embodiments of the invention.

BRIEF DESCRIPTION OF THE DRAWINGS

In the drawings, which illustrate embodiments of the invention.

DETAILED DESCRIPTION OF THE PREFERRED EMBODIMENTS

Figure 1:
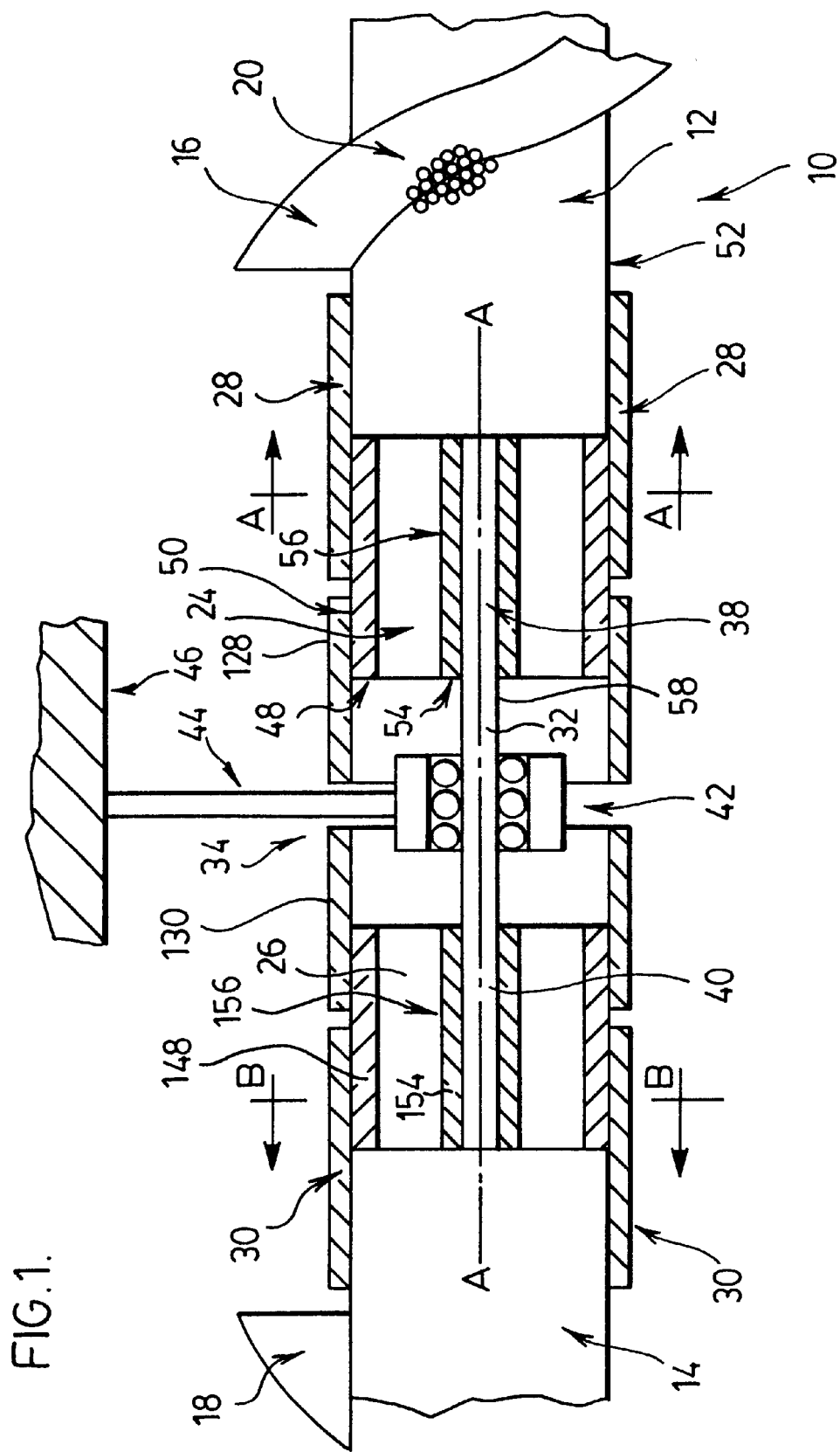
FIG. 1 is a schematic, cross-sectional and perspective illustration of a preferred embodiment of the invention.

As shown in FIG. 1, one embodiment of the present invention is shown in association with a screw conveyor 10. The screw conveyor 10 comprises a first screw conveyor length 12 and a second screw conveyor length 14. The first and second screw conveyor lengths 12, 14 are aligned axially along an axial axis A. The screw conveyor lengths 12, 14 have screw flights 16, 18 which move material 20 which is intended to be moved by the screw conveyor 10. In a preferred application, the screw conveyor 10 is used in the blast cleaning industry to move blast cleaning shot which is typically metal pellets or balls.

A preferred embodiment of the support and coupling assembly 22 comprises a first deflection-accommodating means 24 and a second deflection-accommodating means 26. The first deflection-accommodating means 24 is for accommodating at least some of the deflection off the axial axis A between the first screw conveyor length 12 and the second screw conveyor length 14. Similarly, the second deflection-accommodating means is for accommodating at least some of the deflection off the axial axis A between the first screw conveyor length 12 and the second screw conveyor length 14. Preferably, the first and second deflection-accommodating means 24, 26 together accommodate all, or at least most, of the deflection between the first and second screw lengths 12, 14.

The first deflection-accommodating means 24 is connected to the first screw conveyor length by a first connecting means 28 such as metal strips. Preferably the first connecting means 28 comprises a pair of half-moon clamping brackets.

Similarly, the second deflection-accommodating means 26 is connected to the second screw conveyor length 14 by a second connecting means 30 which may include any suitable device such as metal connecting strips or a clamping bracket. Preferably the second connecting means 30 is a pair of half-moon clamping brackets.

A drive shaft 32 connects the first deflection-accommodating means 24 to the second deflection-accommodating means 26. Preferably the drive shaft 32 is a shaft having a square cross-section.

A support means 34 supports the drive shaft 32 at an intermediate location 36 inter-mediate of the first end 38 of the drive shaft 32 and the second end 40 of the drive shaft 32. in a preferred embodiment, the support means 34 comprises a support bearing 42 which is connected through a support member 44 to a fixed object 46. In FIG. 1, the support member 44 is shown as extending upwardly to the fixed object 46. However, the fixed object 46 could be below or to the side of the support bearing 42 and the support member 44 would be positioned in an appropriate corresponding location.

The first deflection-accommodating means 24 comprises an outer member 48 which is aligned axially and concentrically with the first length of screw conveyor 12 along the axial axis A. The outer member 48 is preferably a cylinder which has an outer diameter 50 which is substantially the same as the outer diameter 52 of the first screw conveyor 12.

The first deflection-accommodating means 24 also has an inner member 54 aligned axially and concentrically within the outer member 48 along the axial axis A. The inner member 54 is preferably a cylinder which has an outer diameter 56 which is greater than the outer diameter 58 of the drive shaft 32. If the drive shaft 32 is not circular in cross-section, then the outer diameter 58 of the drive shaft 32 should be understood to mean the greatest cross-sectional distance across the drive shaft 32. For example, in the case of a drive shaft 32 with a square cross-section, the outer diameter 58 should be understood to be the distance from one corner to the diagonally-opposite corner.

Similarly, it the outer member 48 or the inner member 54 is not circular in cross-section, then the respective outer diameters 52 and 56 of the outer and inner members 48 and 54 should be understood to mean the greatest cross-sectional distance across the respective outer or inner member 48 or 54.

In a preferred embodiment of the invention, the cross-sectional shape of the inner member 54 is substantially the same as the cross-sectional shape of the drive shaft. For example, if the drive shaft has a circular cross-sectional shape, then preferably the inner member 54 will also have a circular cross-sectional shape. Similarly, if the drive shaft 32 has a square cross-sectional shape, preferably the inner member 54 has a square cross-sectional shape.

In a most preferred embodiment of the invention, the drive shaft 32 has a square cross-sectional shape and the inner member also has a square cross-sectional shape such that the drive shaft 32 fits snugly within the inner member 54.

Preferably, the outer member 48 and the inner member 54 have the same axial length and are oriented such that each of the outer member 48 and the inner member 54 extend axially the same distance from the first screw conveyor length 12.

Figure 2:
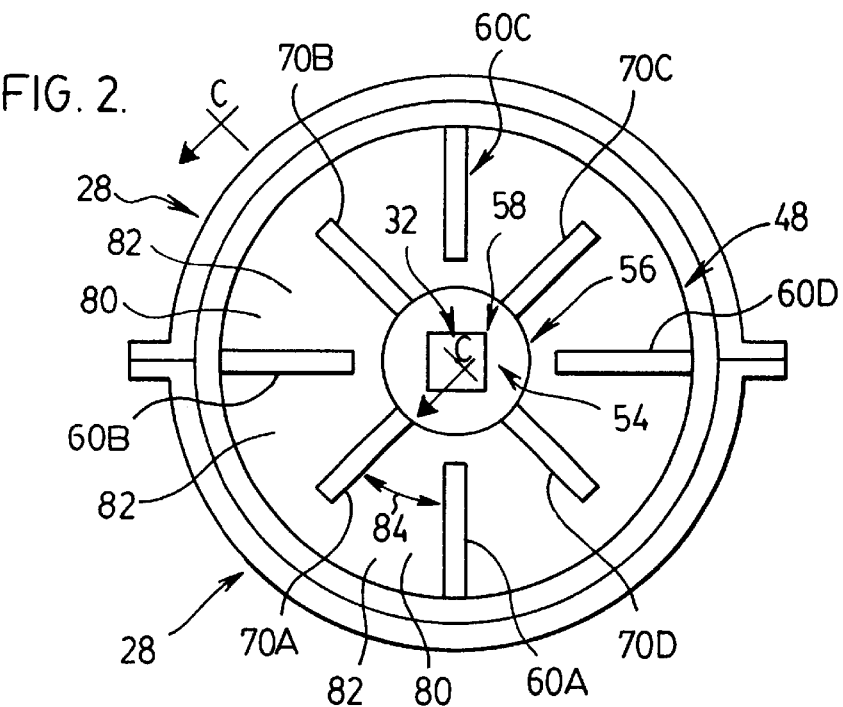
FIG. 2 is a schematic, cross-sectional view of a preferred embodiment of the invention along line A—A in FIG. 1.

The first deflection-accommodating means 24 has a plurality of blades 60A, 60B, 60C and 60D as best seen in the cross-sectional view at FIG. 2 wherein each blade 60A, 60B, 60C and 60D extends radially inwardly from the outer member 48 and axially along the outer member 48.

There is also a second plurality of blades 70A, 70B, 70C and 70D wherein each blade 70A, 70B, 70C and 70D extends radially outwardly from the inner member 54 and axially along the inner member 54.

Figure 3:
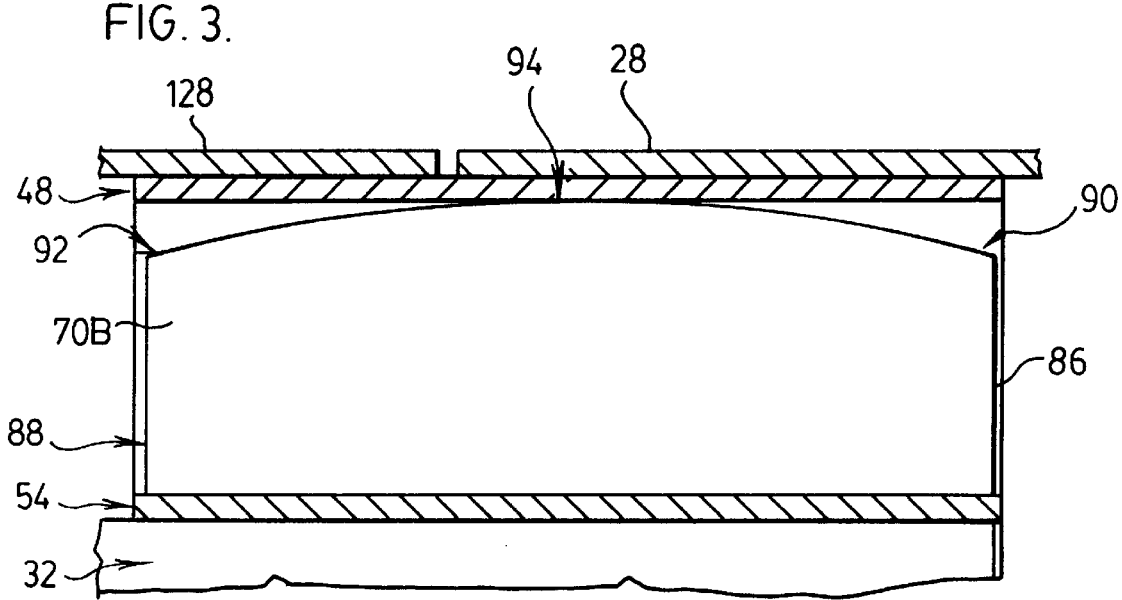
FIG. 3 is a schematic, partial cross-sectional view along line C—C in FIG. 2.

Preferably each of the blades 60A–60D and 70A–70D extends axially for most of the length of the outer member 48 and the inner member 54 as shown schematically in FIG. 3.

Preferably each of the blades 60A–60D and 70A–70D has the same shape, although it would be possible to vary the shape of individual blades or between the two pluralities of blades. A single blade 70B is shown in FIG. 3 to show the preferred shape of the blade, and is representative of each of the other blades 70B–70D and 60A–60D of the preferred embodiment of the blades and invention.

The blades 60A–60D which extend inwardly from the outer member 48 are spaced alternately with and angularly from the blades 70A–70D which extend outwardly from the inner member 54 to form angular spaces 80 between the various blades, for example between blades 60A and 70A.

Preferably there are four blades 60A–60D which are spaced equally around the outer member 48. and preferably there are four blades 70A–70D which are spaced equally around the inner member 54. In this sense. the term "spaced equally" means that the angular spaces 80 between adjacent blades are all of the same angular distance 84. In a preferred embodiment, the angular distance 84 between adjacent blades is 45°.

Figure 6:
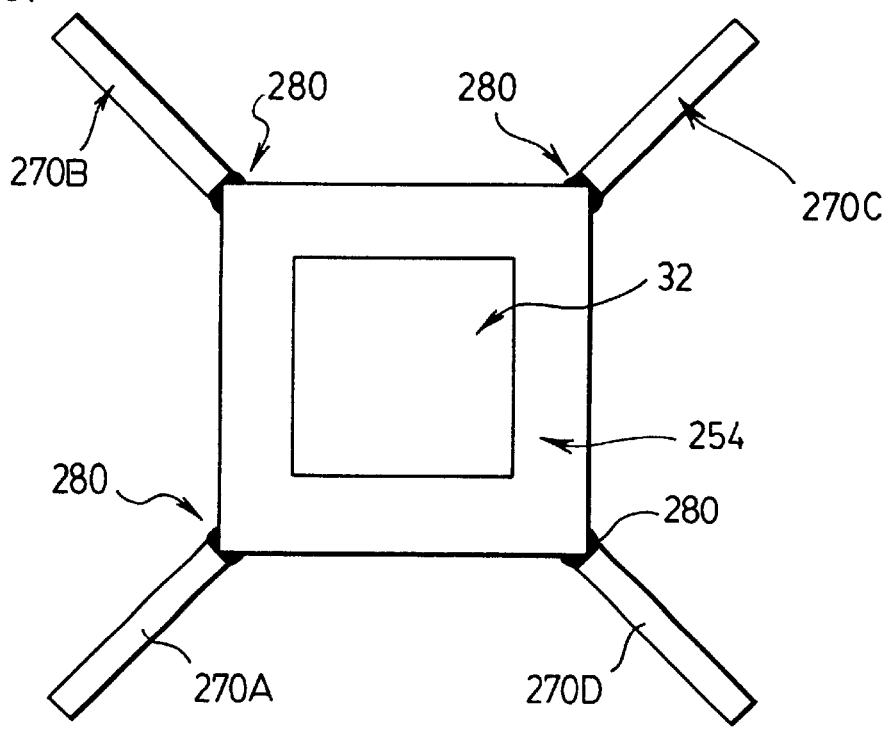
FIG. 6 is a cross-sectional view of a further preferred embodiment of the invention.

Preferably, as shown in FIG. 6, each of the blades which extends radially from the inner member 254 which has a square cross-sectional shape corresponding to the square cross-sectional shape of the drive shaft 32 has blades 270A to 270D which extend radially from the respective corner areas 280 of the inner member 254.

A resilient material 82 is placed in the angular spaces 80 between blades. Preferably the resilient material 82 forms an integral whole throughout and is connected from angular space to angular space. However, the resilient material 82 could be discrete amounts of material in specific angular spaces 80 between two specific blades.

Preferably the resilient material 82 is a polyurethane and most preferably a polyurethane with about an 80 durometer density.

The resilient material 82 is selected so as to give sufficient rigidity such that the angular rotation of the first screw conveyor length 12 is transmitted through the outer member 48 of the first deflection-accommodating means 24, through the first plurality of inwardly-extending blades 60A–60D. and then through the resilient material 82 to the outwardly-extending blades 70A–70D, and thereby to the inner member 54 and to the drive shaft 32, all with minimal rotational slip or movement between the outer member 48 and the inner member 54.

On the other hand, the resilient material 82 must be sufficiently resilient such as to permit deflection off the axial ixis A of the outer member 48 relative to the inner member 54.

In order to accommodate deflection off the axial axis A of the outer member 48 in relation to the inner member 54, each blade 60A–60D and 70A–70D has a first axial end 86 as shown representatively in FIG. 3 with respect to blade 70B. Blade 70B also has a second axial end 88. Each of the axial ends 86, 88 of each blade has a radially-distant end, indicated as 90 with respect to end 86 and indicated as 92 with respect to end 88.

In order to accommodate deflection of the outer member 48 in relation to the inner member 54, it is important to ensure that the radially-distant ends of each of the blades, for example radially-distant ends 90, 92 of blade 70B in FIG. 3, do not contact the respective opposite cylinder 48 or 54 when the first deflection-accommodating means 24 is in a non-deflected orientation (outer and inner members 48, 54 aligned axially). For example, it is important that the radially-distant ends 90, 92 of the blade 70B do not contact the outer member 48 when the first deflection-accommodating means is in a non-deflected orientation, such as shown in FIG. 3. Similarly, the radially-distant ends of the inwardly-extending blades do not contact the inner member 54 when the deflection accommodating means 24 is in a non-deflected orientation.

The blades 60A–60D and 70A–70D have a portion 94 which is intermediate of the radially distant ends 90, 92 (as shown representatively with respect to blade 70B in FIG. 3). In a preferred embodiment of the invention, the intermediate portion 94 of at least some of the blades contacts the opposite cylinder, for example in the case of blades 60A–60D, the intermediate portion 94 contacts the inner member 54. In the case of blades 70A–70D, and specifically blade 70B as shown in FIG. 3, the intermediate portion 94 contacts the outer member 48.

The advantage gained by having the intermediate portion 94 of at least some of the blades contact the opposite cylinder is that it is easier to orient and configure the inner member 54 within the outer member 48 prior to the resilient material 82 being placed in the angular spaces 80. In a preferred embodiment, the resilient material 82 is poured as a liquid into the angular spaces 80 and if the inner member 54 can be kept in a proper orientation during this pouring step by means of a least some of the blades contacting the opposite cylinder, less time, effort and money will be expended in order to manufacture the first deflection-accommodating means 24.

Each of the blades 60A–60D and 70A–70D has a radially-distant edge 94 which extends from the radially-distant end 90 to the other radially-distance end 92, as shown representatively with respect to blade 70B in FIG. 3. In a preferred embodiment, the radially-distant edge 96 is curved so as to accommodate reasonable deflection off the axial axis A of the inner and outer members 54, 48 relative to each other. However, the radially-distant edge 96 could be linear from one radially-distant edge 90 to the intermediate portion 94 and then linear from the intermediate portion 94 to the other radially-distant end 92.

In a most preferred embodiment of the invention, the radially-distant edge 96 of each blade 60A–60D and 70A–70D is curved radially outwardly from the radially-distant end 90 of the first axial end 86 to the intermediate portion 94 and then the radially-distant edge 96 of the blade 60A–60D and 70A–70D is curved radially inwardly from the intermediate portion 94 to the radially-distant end 92 of the second axial end 88, as shown representatively with respect to blade 70B in FIG. 3.

Figure 4:
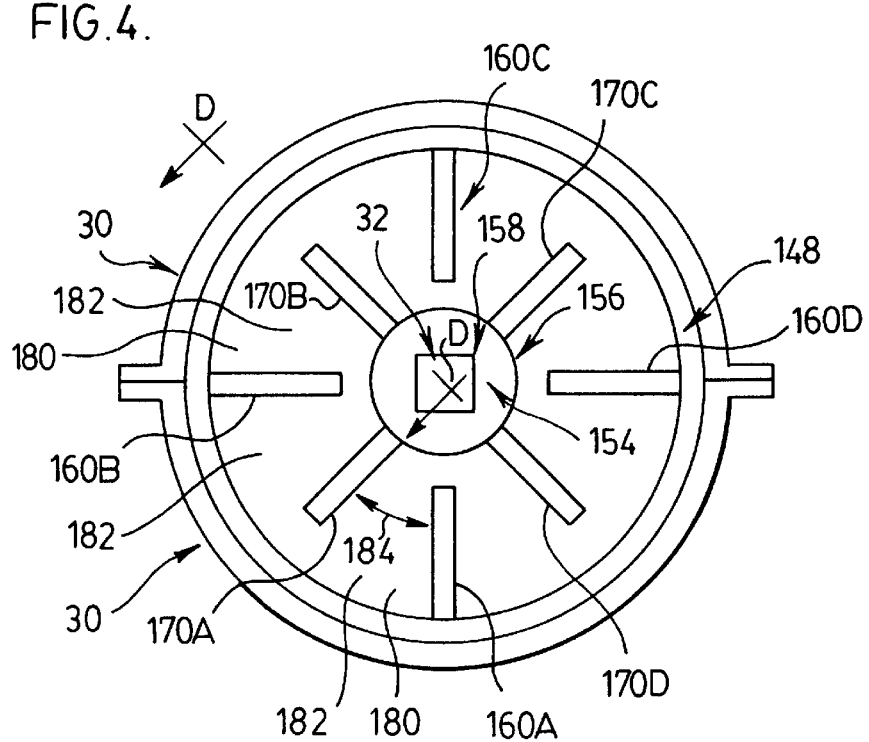
FIG. 4 is a schematic, cross-sectional view of a preferred embodiment of the invention along line B—B in FIG. 1.
Figure 5:
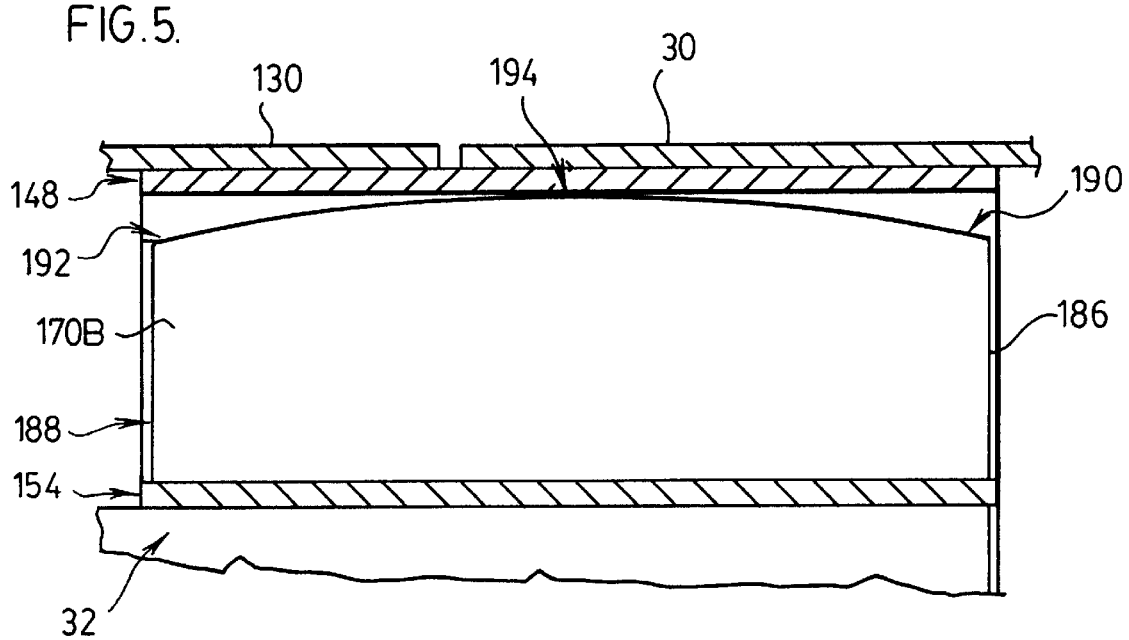
FIG. 5 is a schematic, partial cross-sectional view along line D—D in FIG. 4.

The second deflection-accommodating means 26 is substantially the same as, and functions substantially the same as, the first deflection-accommodating means 24, except it is connected by the second connecting means 30 to the second screw conveyor length 14. The various elements of the second deflection-accommodating means 26 are shown in FIGS. 1, 4 and 5 with reference numerals for an equivalent element of the second deflection-accommodating means 26 beginning with the digit "1" in front of the reference numeral of the equivalent element in the first deflection-accommodating means 24.

Because the first and second deflection-accommodating means 24 and 26 accommodate a reasonable amount of deflection between the first screw conveyor length 12 and the second screw conveyor length 14, the support member 34 and the drive shaft 32 need not be as rigidly fixed with respect to the fixed object 46 as they would otherwise need to be, thereby providing for easier installation and maintenance of the support and coupling assembly 22 of the present invention.

In a further preferred embodiment of the invention, the support and coupling assembly 22 comprises a protection means for minimizing the amount of material 20 (which is intended to be transported by the screw conveyor length 12) which undesirably is placed in contact with the parts of the assembly 22. such as the support bearing 42, the drive shaft 32 and the first and second deflection-accommodating means 24, 26. so as to protect those parts from damage caused by the material 20. If the amount of material 20 which comes in contact with the support bearing 42. The drive shaft 32 and the first and second deflection-accommodating means 24, 26 is not minimized the material 20 will cause an earlier degradation and deterioration of the support bearing 42. drive shaft 32 and deflection-accommodating means 24, 26.

In a further preferred embodiment of the invention, the protection means comprises extensions 128 from the clamping brackets 28 which extend to the support member 44 of the support means 34 thereby surrounding the drive shaft 32 and the first deflection means 24, and partially surrounding the support bearing 42, by the extensions 128. There are similar extensions 130 from the clamping brackets 30 associated with the second screw conveyor length 14.

Figure 7:
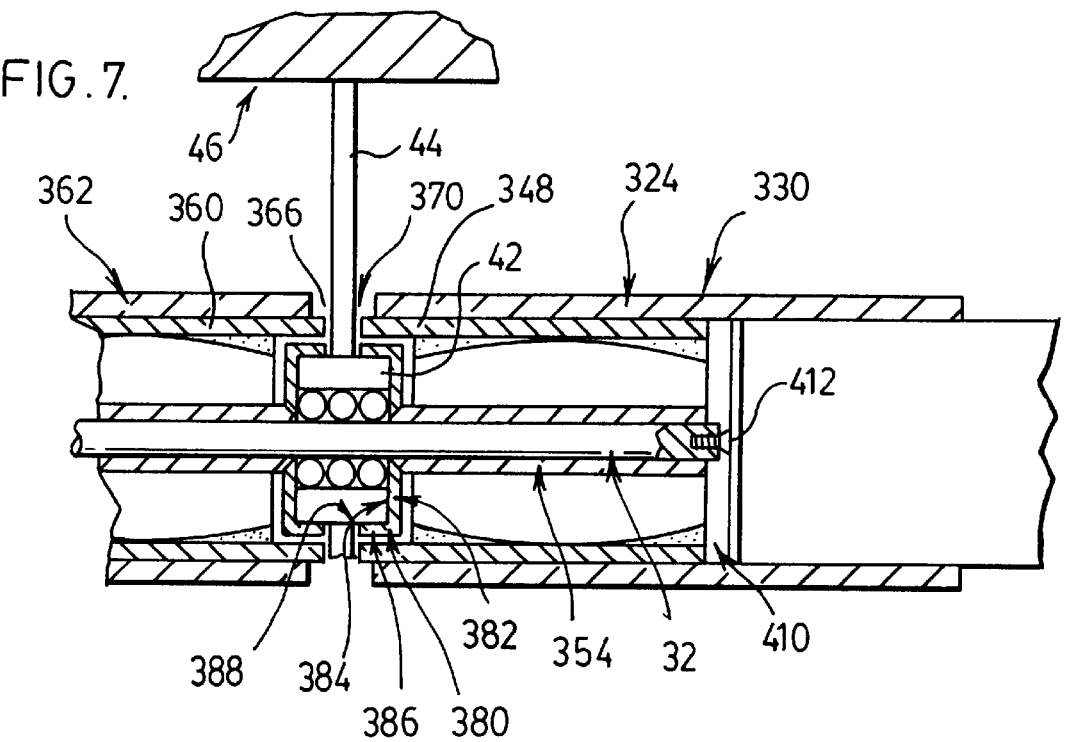
FIG. 7 is a schematic. partial cross-sectional view of a further preferred embodiment of the invention.

In a further preferred embodiment of the invention, as shown in FIG. 7, the protection means comprises the outer member 348 of the first deflection-accommodating means 324 extending axially to almost the support member 44 of the support means 34. Preferably the gap 370 between the extended outer member 348 of the first deflection-accommodating means 324 is small enough to minimize the amount of material 20 which comes in contact with the support bearing 342. Most preferably, the gap 370 is smaller than blast cleaning shot used in the blast cleaning industry.

Preferably, in this embodiment, the clamping brackets 330 are also extended closer to the support member 44.

In this preferred embodiment, the outer member 360 of the second deflection-accommodating means 362 is also extended axially to almost the support member 44. Preferably. The gap 366 between the outer member 360 of the second deflection-accommodating means 362 and the support member 44 is similarly small enough to minimize the amount of material 20 which comes in contact with the bearing 42 and, preferably to effectively prevent the entry of blast cleaning shot.

In a further preferred embodiment of the invention. there is a cap 380 which fits around the support bearing 42. The cap 380 is comprised of a plate 382 which is positioned closely to the side of the support bearing 384. In one embodiment. The cap plate 382 is permanently fixed, for example by welding, to the inner member 354 of the first deflection-accommodating means 324. The drive shaft 32 passes through the cap plate 382.

The cap 380 also has an outer cap portion 386 which fits closely to the outer surface 388 of the bearing 42.

Preferably the gap 390 between the cap and the outer member 348 of the first deflection-accommodating means 324 is small enough to minimize the amount of material 20 which comes in contact with other parts of the assembly. Preferably the gap 390 is smaller than the blast cleaning shot used in the blast cleaning industry.

The cap 380 further comprises a similar cap plate 392 and a similar outer cap portion 394 which surround the bearing 42 and co-operate with the second deflection-accommodating means 362 in the same manner as described above with respect to the first deflection-accommodating means 324.

In another preferred embodiment of the invention, as shown in FIG. 7, the drive shaft 32 is connected to the first deflection-accommodating means 324 by means of an end plate 410 by suitable means such as welding. One preferred means of connecting the end plate 410 to the drive shaft 32 is by means of a screw 412. Preferably the drive shaft 32 is actually seated in the end plate 410.

In this preferred embodiment, the drive shaft 32 is also connected to the second deflection-accommodating means 362 by means of a similar end plate.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments which are functional or mechanical equivalents of the specific embodiments and features that have been described and illustrated herein.

I claim:

1. In a screw conveyor comprising first and second screw conveyor lengths aligned axially along an axial axis, a support and coupling assembly comprising:

first deflection-accommodating means for accommodating deflection off the axial axis between the first screw conveyor length and the second screw conveyor length;

second deflection-accommodating means for accommodating deflection off the axial axis between the first screw conveyor length and the second screw conveyor length;

first connecting means for connecting the first deflection-accommodating means to the first screw conveyor length;

second connecting means for connecting the second deflection-accommodating means to the second screw conveyor length;

a drive shaft connecting the first deflection-accommodating means to the second deflection-accommodating means; and support means for supporting the drive shaft;

wherein the first deflection-accommodating means comprises:

an outer member aligned axially and concentrically with the second length of screw conveyor along the axial axis, and having an outer diameter substantially the same as an outer diameter of the first screw conveyor;

an inner member aligned axially and concentrically within the outer member along the axial axis, and having an outer diameter greater than an outer diameter of the drive shaft;

a first plurality of blades wherein each blade extends radially inwardly from the outer member and axially along the outer member;

a second plurality of blades wherein each blade extends radially outwardly from the inner member and axially along the inner member;

wherein the blades of the first plurality of inwardly-extending blades are spaced alternately with and angularly from the blades of the second plurality of outwardly-extending blades to form angular spaces between blades; and a resilient material in the angular spaces between blades;

wherein the second deflection-accommodating means comprises:

an outer member aligned axially and concentrically with the second length of screw conveyor along the axial axis, and having an outer diameter substantially the same as an outer diameter of the second screw conveyor;

an inner member aligned axially and concentrically within the outer member along the axial axis, and having an outer diameter greater than an outer diameter of the drive shaft;

a first plurality of blades wherein each blade extends radially inwardly from the outer member and axially along the outer member;

a second plurality of blades wherein each blade extends radially outwardly from the inner member and axially along the inner member;

wherein the blades of the first plurality of inwardly-extending blades are spaced alternately with and angularly from the blades of the second plurality of outwardly-extending blades to form angular spaces between blades; and a resilient material in the angular spaces between blades;

wherein a first end of the drive shaft is fixed within the inner member of the first deflection-accommodating means;

wherein a second end of the drive shaft is fixed within the inner member of the second deflection-accommodating means; and wherein the support means comprises a support bearing supporting the drive shaft intermediate of the first end and the second end of the drive shaft and a support member supporting the support bearing to a fixed object.

2. The assembly as defined in claim 1 wherein each blade of the first and second pluralities of blades has a first axial end and a second axial end, each of the axial ends of each blade has a radially-distant end, and the radially-distant end of each of the blades of the first plurality of blades does not contact the inner member when the deflection-accommodating means is in a non-deflected orientation, and the radially-distant end of each of the blades of the second plurality of blades does not contact the outer member when the deflection-accommodating means is in a non-deflected orientation.

3. The assembly as defined in claim 2 wherein at least some of the blades of the pluralities of blades have a portion of the blade intermediate of the radially-distant ends of the first and second axial ends which contacts, in the case of blades of the first plurality of blades the inner member, and in the case of blades of the second plurality of blades the outer member.

4. An assembly as defined in claim 3 wherein each blade has a radially-distant edge which is curved so as to accommodate reasonable deflection of the inner and outer members relative to each other.

5. An assembly as defined in claim 4 wherein the radially-distant edge of each blade is curved radially outwardly from the radially-distant end of the first axial end to the portion intermediate of the radially-distant ends of the first and second axial ends and then the radially-distant edge of the blade is curved radially inwardly from the intermediate portion to the radially-distant end of the second axial end of the blade.

6. An assembly as defined in claim 5 wherein the first plurality of blades has four blades spaced equally around the outer member and the second plurality of blades has four blades which are spaced equally around the inner member, such that the angular distance between adjacent blades is 45°.

7. An assembly as defined in claim 6 wherein each connecting means comprise a pair of clamping brackets.

8. An assembly as defined in claim 7 wherein the resilient material is polyurethane.

9. An assembly as defined in claim 8 wherein the assembly further comprises a protection means for minimizing the amount of material intended to be transported by the screw conveyor length which is placed in contact with the support bearing, the drive shaft and the first and second deflection-accommodating means so as to protect the support bearing, drive shaft and deflection-accommodating means from damage caused by the material.

10. An assembly as defined in claim 9 wherein the protection means comprises extensions from the clamping brackets which extend axially to the support member of the support means, and the drive shaft and the first and second deflection-accommodating means are surrounded by the extensions and the support bearing is partially surrounded by the extensions.

11. An assembly as defined in claim 9 wherein the protection means comprises the outer member of the first deflection-accommodating means and the outer member of the second deflection-accommodating means extended axially to almost the support member of the support means.

12. An assembly as defined in claim 11 wherein the protection means further comprises a cap placed around the support bearing, and the gaps between the extended portions of the outer members of the first and second deflection-accommodating means and the support member and the cap are sufficiently small so as to effectively prevent the entry of blast cleaning shot.

13. An assembly as defined in claim 12 wherein the material intended to be transported is blast cleaning shot used in the blast cleaning industry.

14. An assembly as defined in claim 2 wherein the drive shaft is connected to the first deflection-accommodating means by a screw through an end plate on the first deflection-accommodating means, and wherein the drive shaft is connected to the second deflection-accommodating means by a screw through an end plate on the second deflection-accommodating means.

15. An assembly as defined in claim 2 wherein the outer member is a cylinder;

wherein the drive shaft has a square cross-sectional shape; and wherein the inner member has a square cross-sectional shape.

16. An assembly as defined in claim 4 wherein the outer member is a cylinder;

wherein the drive shaft has a square cross-sectional shape; and wherein the inner member has a square cross-sectional shape.

17. An assembly as defined in claim 12 wherein each of the blades of the second plurality of blades extends radially from a corner of the inner member.

18. An assembly as defined in claim 13 wherein each of the blades of the second plurality of blades extends radially from a corner of the inner member.

19. An assembly as defined in claim 14 wherein each of the blades of the second plurality of blades extends radially from a corner of the inner member.

20. An assembly as defined in claim 15 wherein each of the blades of the second plurality of blades extends radially from a corner of the inner member.

* * * * *